(12) United States Patent
Watanabe et al.

(10) Patent No.: US 6,449,400 B1
(45) Date of Patent: Sep. 10, 2002

(54) SENSING OPTICAL FIBER AND SENSOR SYSTEM

(75) Inventors: Kazuhiro Watanabe, Zushi; Hideo Kiji, Kanagawa-ken, both of (JP)

(73) Assignee: Kabushiki Gaisha Inter Action, Kanagawa-ken (JP)

( * ) Notice: Subject to any disclaimer, the term of this patent is extended or adjusted under 35 U.S.C. 154(b) by 0 days.

(21) Appl. No.: 09/180,893

(22) PCT Filed: May 26, 1997

(86) PCT No.: PCT/JP97/01766

§ 371 (c)(1), (2), (4) Date: Nov. 16, 1998

(87) PCT Pub. No.: WO97/48994

PCT Pub. Date: Dec. 24, 1997

(30) Foreign Application Priority Data

Jun. 21, 1996 (JP) ............................................. 8-162179

(51) Int. Cl.$^7$ ............................. G02B 6/00; G02B 6/255
(52) U.S. Cl. ........................................... 385/12; 385/96
(58) Field of Search ..................... 385/12, 96

(56) References Cited

U.S. PATENT DOCUMENTS

| | | | | |
|---|---|---|---|---|
| 5,144,690 A | * | 9/1992 | Domash | 385/12 |
| 5,164,588 A | * | 11/1992 | Marcus | 385/12 |
| 5,361,383 A | * | 11/1994 | Chang et al. | 385/27 |

FOREIGN PATENT DOCUMENTS

| | | |
|---|---|---|
| JP | 55-57706 | 4/1980 |
| JP | 55-110207 | 8/1980 |
| JP | 57-078002 | 5/1982 |
| JP | 63-286739 | 11/1988 |
| JP | 02-130447 | 5/1990 |
| JP | 04-086510 | 3/1992 |
| JP | 07-063921 | 3/1995 |
| JP | 08-125607 | 5/1996 |

\* cited by examiner

*Primary Examiner*—Frank G. Font
*Assistant Examiner*—Philip Natividad
(74) *Attorney, Agent, or Firm*—Wenderoth, Lind & Ponack, L.L.P.

(57) ABSTRACT

A sensing optical fiber and a sensor system which has both the functions of an optical transmission line and a sensor device and which detects many types of information from the light transmission loss. A sensing optical fiber can detect information with a high detection sensitivity by an OTDR method using Rayleigh scattered light. For this purpose, the sensing optical fiber includes a main line element which is an optical fiber installed as a light transmission line and sensor elements which are relatively short optical fibers that are inserted in intermediate parts of the main line element and whose core diameters are different from that of the main line element. The sensor system is capable of detecting various types of information obtained simultaneously with a high detection sensitivity by an OTDR method using Rayleigh scattered light. For this purpose, a sensor system includes sensing optical fibers and a measuring instrument which detects information around the light transmission line, in which the sensing optical fibers are provided, by using back-scattered light of the sensing optical fibers. In the sensor system, a plurality of the sensing optical fibers are provided, and the sensing optical fibers have a different number of the sensor elements, different distances between the sensor elements and different sensor element core diameters. Also, an optical switch, by which the sensing optical fibers are selectively switched, is provided between the sensing optical fibers and the measuring instrument.

14 Claims, 6 Drawing Sheets

SENSING OPTICAL FIBER AND SENSOR SYSTEM

BACKGROUND OF THE INVENTION

1. Technical Field This invention relates to a sensing optical fiber and a sensor system thereof, which both have the. functions of an optical transmission line and a sensor device and serve to detect various types of information by virtue of the light transmission loss. More particularly, this invention relates to an optical system having improved sensitivity of detecting information by virtue of the light transmission loss and discriminating the type of the detected information.

2. Description of Related Art

An OTDR (optical time domain reflectometry) method for detecting information of light transmitted through an optical fiber is known in the art. This detection method serves to measure the information of the light transmitted through a light transmission line at an arbitrary position of the light transmission line in real time, and is carried out by letting light pulses of a laser beam or the like into an optical fiber, causing the incident light pulses to turn back halfway as back-scattered light toward the incident side (backward side), and effecting time-resolved measurement of the back-scattered light.

A known technique, using the detection method, includes an optical fiber that serves as the light transmission line is connected to an OTDR device having the function of a linear sensor, so that information as to an ambient temperature around the light transmission line is detected by measuring Raman scattered light having high temperature dependency in the back-scattered light or information as to distortion of the optical fiber transmission line is detected by measuring Rayleigh scattered light having high scattering coefficient in the back-scattered light.

The Raman scattered light is feeble in scattering coefficient, and the incident light for the Raman scattered light differs in wavelength from the scattered light of the same. Therefore, the OTDR device, which serves as a measuring instrument, and its attachments tend to be complicated and expensive. Under the circumstances, a need has been felt for a generalized technique capable of using the Rayleigh scattered light.

The aforementioned prior art entails a disadvantage such that the information detecting device making use of the Rayleigh scattered light is lower in sensitivity to temperature, distortion or the like of. the optical fiber transmission line, and thus, it is difficult in practical application.

SUMMARY OF INVENTION

The first technical object of the present invention is to provide a sensing optical fiber capable of increasing the sensitivity of detecting information by an OTDR method making use of Rayleigh scattered light.

The second technical object of the present invention is to provide a sensor system capable. of increasing the sensitivity of detecting various types of information obtained simultaneously by an OTDR method making use of Rayleigh scattered light.

The main line element and sensor element are connected to each other by a fusing technique which is widely applied, and therefore, the sensing optical fiber can easily be produced at a low cost.

To achieve the first technical object of the present invention, there is provided a sensing optical fiber comprising a main line element of optical fiber arranged as a light transmission line, and sensor elements of optical fiber connected by fusing to intermediate parts of the main line element. The sensor elements each have a core different in diameter from the core of the main line element and are relatively short in length.

In the light transmission line provided as one solution for achieving the first technical object of the invention, the sensor elements are formed as hetero-structures in the intermediate parts in the main line element of the light transmission line so as to allow a part of the light being propagated along the light transmission line to leak out to the clad of the optical fiber at the interface between the sensor element and the main line element. Enlargement of the change of the Rayleigh scattered light due to the ambient temperature, distortion or the like of the light transmission line makes it possible to increase the sensitivity of detecting the information. The main line element and sensor element are connected to each other by a fusing technique which is widely applied, and therefore, the sensing. optical fiber can easily be produced at a low cost. Furthermore, since the external shape of the light transmission line is made substantially uniform, the light transmission line can be handled by an ordinary fiber-laying technique.

Another solution for. achieving the first technical object of the invention is implemented by providing a sensing optical fiber, in which a number of sensor elements are. arranged at regular or irregular intervals in the intermediate parts of the main line element in the foregoing structure.

According to this solution, distribution of the changes of the Rayleigh scattered light propagated along the light transmission line can be perceived, and the sensitivity of detecting the information can be improved while widening the band width in which the information is detected.

Yet another solution for achieving the aforementioned first technical object of the invention is implemented by providing a sensing optical fiber, in which the optical fiber of the main line element is different in light transmission mode from the optical fiber in the foregoing structure.

According to this solution, since transformation of the transmission mode takes place in the sensor elements to increase the changes of the Rayleigh scattered light, which are caused due to the ambient temperature, distortion, liquid adhesion or the like of the light transmission line, the detection sensitivity of detecting the information can be increased.

A further solution for achieving the aforementioned first technical object of the invention is implemented by providing a sensing optical fiber which comprises a main line element of optical fiber arranged as an optical transmission line, and a relatively short sensor element connected by fusing to an intermediate part of the main line element and formed of material capable of passing light therethrough. The sensor element is different in refractive index from a core in the main line element.

According to this solution, the sensing optical fiber brings about the same function and effect as those described above, and besides, permits almost all of the light being transmitted through the main line element to leak out at the interface between the main line element and the sensor element, so that the changes of the Rayleigh scattered light can be extremely increased due to the ambient temperature, distortion or the like of the light transmission line. As a result, the light transmission loss brought about by the sensor element becomes large, but the detection sensitivity of detecting the information can be further increased.

A still further solution for achieving the aforementioned first technical object of the invention is implemented by providing a sensing optical fiber, in which a number of sensor elements are arranged at regular or irregular spacing intervals in the intermediate parts of the main line element in the sensing optical fiber.

According to this solution, the sensing optical fiber brings about the same function and effect as those described above.

The other solution for achieving the aforementioned first technical object of the invention is implemented by providing a sensing optical fiber, in which only one sensor element is inserted in the intermediate part of the main line element in the sensing optical fiber.

According to this solution, since the light transmission loss brought about by the sensor element becomes large, the light transmitted through the light transmission line can be intensively detected from the main line element with high efficiency.

One solution for achieving the second technical object of the invention is implemented by providing a sensor system, which comprises sensing optical fibers and a measuring instrument which detects information around the light transmission line incorporating the sensing optical fibers by using back-scattered light of the sensing optical fibers. The sensing optical fibers are formed of main line elements of optical fiber arranged as a light transmission line, and relatively short sensor elements are inserted in the intermediate parts of the light transmission line of the main line elements and each of the sensor elements has a core that is different in diameter from the core of the main line element. The sensor elements are different in number, spacing interval and diameter of core from one another. Also, an optical switch is placed between the respective sensing optical fibers and the measuring instrument so as to selectively switch the sensing optical fibers to be operated.

According to this solution, different types of information can be simultaneously transmitted through the sensing optical fibers having the same function and effect as those described above and selectively retrieved by. operating the optical switches so as to be detected by the measuring instrument, thereby to increase the detection sensitivity of detecting various types of information retrieved simultaneously.

Another solution for achieving the second technical object of the invention is implemented by providing a sensor system, which comprises sensing optical fibers and a measuring instrument which detects information around the light transmission line incorporating the sensing optical fibers by using back-scattered light of the sensing optical fibers. The sensing optical fibers are formed of main line elements of optical fiber arranged as a light transmission line, and relatively short sensor elements inserted in the intermediate parts of the light transmission line of the main line elements. The sensor elements are formed of material capable of passing light therethrough, and each has a core that is different in refractive index from a core in the main line element. The sensor elements are different in number, spacing interval and diameter of core from one another. Also, an optical switch is placed between the respective sensing optical fibers and the measuring instrument so as to selectively switch the sensing optical fibers to be operated.

According to this solution, different types of information can be simultaneously transmitted through the sensing optical fibers having the same function and effect as those described above and selectively retrieved by operating the optical switches so as to be detected by the measuring instrument, thereby increasing the detection sensitivity of detecting various types of information retrieved simultaneously.

Information such as deformation and temperature of an object to be inspected, a fire, flooding, vibration, breaking and angle can be detected by the sensing optical fiber or sensor system as mentioned above. The sensing optical fiber or sensor system as mentioned above may be used in cooperation with sensors of other types.

DETAILED DESCRIPTION OF THE INVENTION

The sensing optical fiber and sensor system according to the present invention will be described hereinafter in detail with reference to the accompanying drawings.

FIG. 1 through FIG. 6 illustrate specific embodiments of the sensing optical fiber according to this invention.

Figure 1:
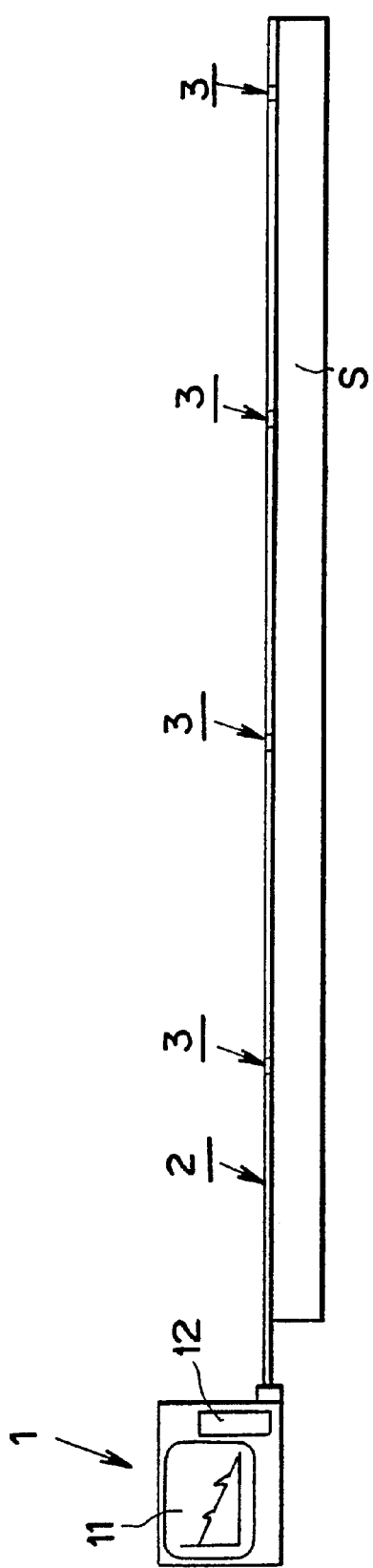
FIG. 1 shows a sensing optical fiber according to the present invention in use.
Figure 2:
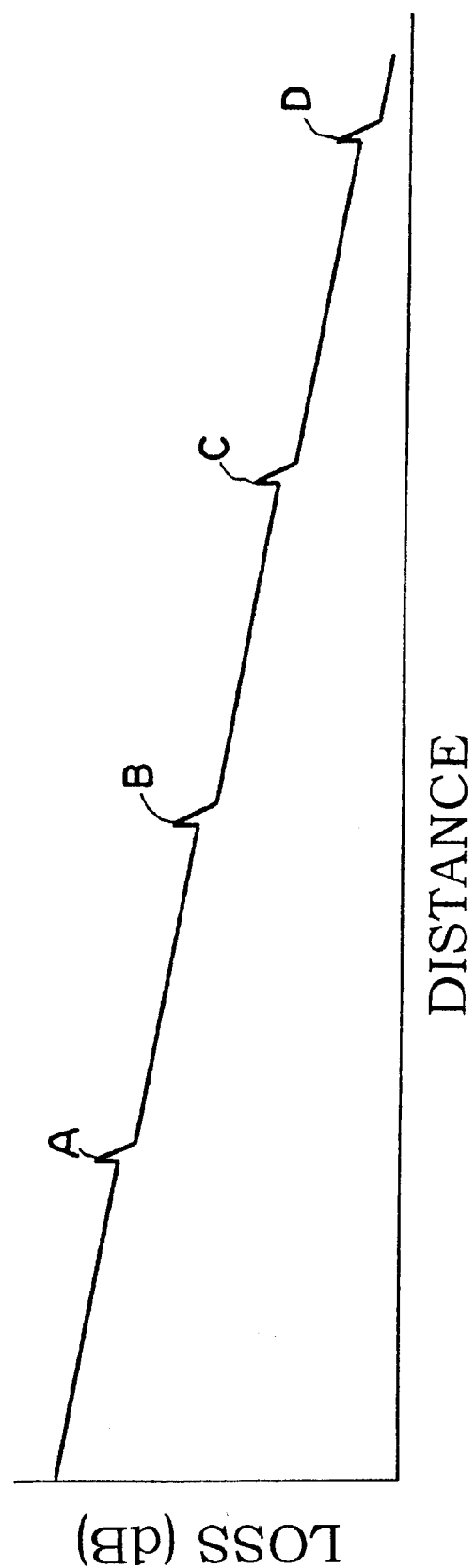
FIG. 2 is an enlarged view showing an image displayed on a display unit in FIG. 1.

The embodiment shown in FIG. 1 is incorporated in a system for performing an OTDR method, which is constructed by connecting an optical fiber to an OTDR device 1. The OTDR device 1 includes a display unit 11 for displaying data in a waveform, and an operating unit 12 for controlling oscillation of light pulses.

In this embodiment, the optical fiber connected to the OTDR device 1 is formed of a main line element 2 and sensor elements 3, each of which has a relatively short length (c) and is connected to the main line element. The optical fiber constituted by the main line element 2 and sensor elements 3 is arranged along an object to be inspected. Since the outer covering structure of the optical fiber constituted by the main line element 2 and sensor elements 3. differs little from that of a conventional optical fiber, the optical fiber of the invention can be handled by an ordinary fiber-laying technique.

Figure 4:
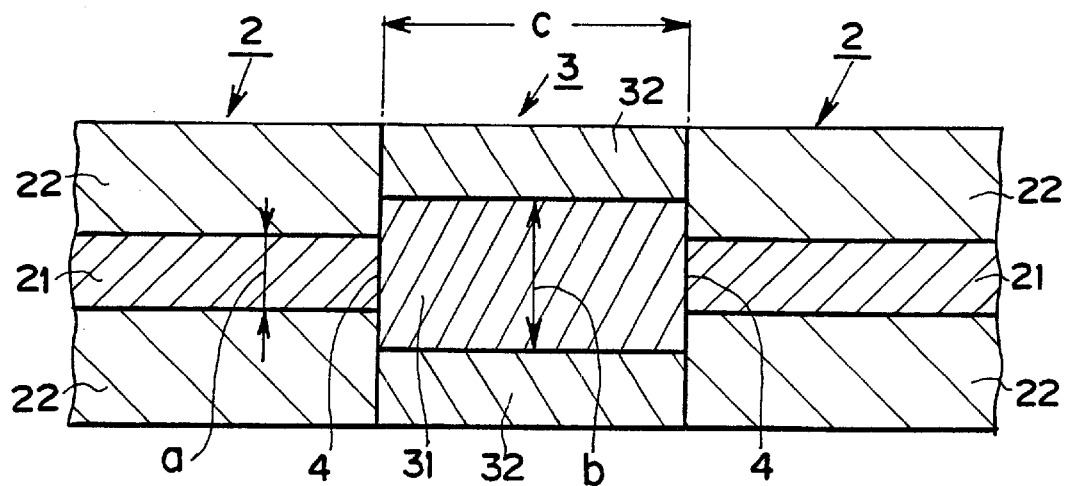
FIG. 4 is an enlarged sectional view showing another embodiment modified from FIG. 3.
Figure 5:
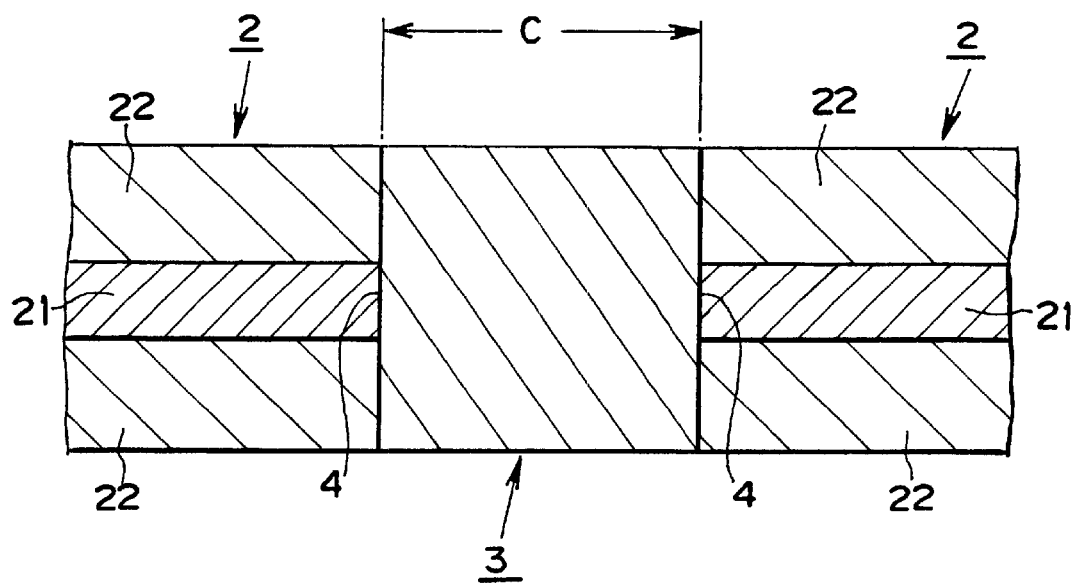
FIG. 5 is an enlarged sectional view showing still another embodiment modified from FIG. 3 or FIG. 4.

The main line element 2 and sensor element 3 comprise cores 21 and 31, clads 22 and 32 confining the cores 21 and 31, and jackets (not shown) confining the clads 22 and 32, respectively. The diameter (a) of the core 21 of the main line element 2 is larger than the diameter (b) of the core 31 of the sensor element 3 (FIG. 3), or the diameter (b) of the core 31 is larger than the diameter (a) of the core 21 (FIG. 4). The main line element 2 and sensor element 3 (of single-mode type or multi-mode type) are operable in either or a combination of identical and non-identical transmission modes. The sensor element 3 may be formed of light transmitting material, which is different in refractive index from that of the core 21 of the main line element 2 so as not to assume a layered structure constituted by the core 31 and the clad 32, as illustrated in FIG. 5.

Figure 3:
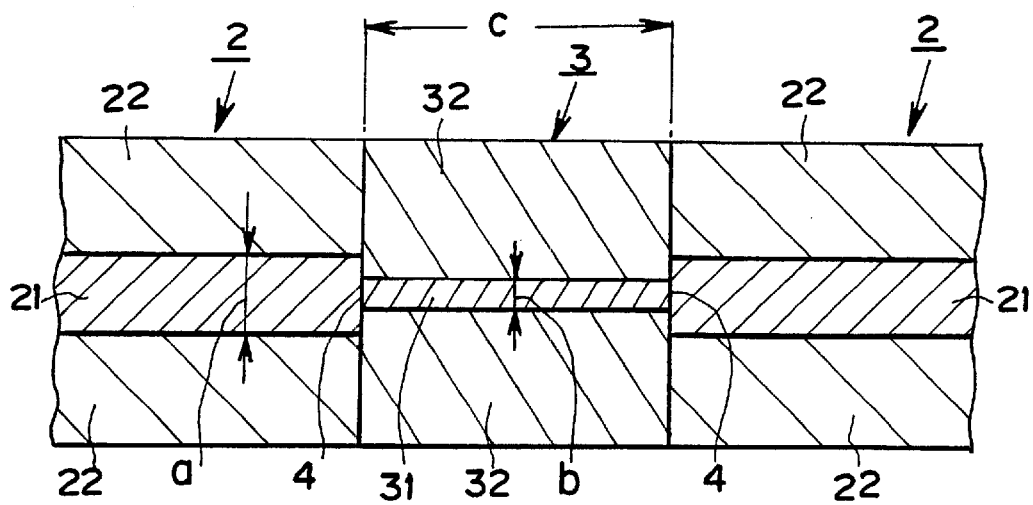
FIG. 3 is an enlarged sectional view showing the principle portion in FIG. 1.

In the optical fiber formed by fusing together the main line element 2 having the core 21 with a diameter (a) of about 9.0 μm, which exhibits a single mode at the wavelength of 1.3 μm (Model SMJ-3Y-1300-9/125 made by OZ Optics), and the single-mode sensor element 3 having the core 31 with a diameter (b) of about 3.0 μm (Model F-SA made by Newport) or about 5.0, μm (Model F-SF made by Newport) as shown in FIG. 3, the detection sensitivity could be increased remarkably by use of the sensor element 3 having a length (c) on the order of 2 to 10 mm.

The main line element 2 and sensor element 3 are coaxially connected to each other at the interface 4, which is perpendicular to the axial line. The coaxial connection of the elements at the interface 4 can be made by an ordinary fusing technique using electric discharge. Accordingly, the optical fiber can easily be produced at a low cost. In the optical fiber illustrated, four sensor elements 3 are disposed at regular spacing intervals in the axial direction of the main line element 2.

The main line elements 2, in the optical fiber described above, serve as a light transmission line for transmitting light pulses issued from the OTDR device 1. The light pulses transmitted partially leak out to the clads 22 and 23 at the interfaces 4 of the hetero-structures formed by the respective main line elements 2 and sensor elements 3 (almost all of the light leaks out at the sensor elements 3 in the optical fiber shown in FIG. 5). In the case where the main line element 2 and the sensor element 3 are different in transmission mode from each other, light transmission loss occurs due to mode transformation. Thus, the light transmission loss caused by the light leakage and mode transformation can be recognized as differences A, B, C and D of Rayleigh scattered light appearing in the waveform displayed on the. display 11 of the OTDR device as shown in FIG. 1. Since all of the main line elements 2 in the optical fiber of the present invention are not mechanically connected to the sensor elements 3, but are integrally fused together thereto so as to connect the elements with a uniform accuracy, the differences A, B, C and D appearing in the displayed waveform are approximately identical to one another. There is a case where small peaks appear due to Fresnel reflection resulting from the difference in refractive index before the differences A, B, C and D.

As a result, the light transmission loss caused due to the light leakage or the efficiency of mode transformation changes with variations in temperature, distortion or the like of the object S to be inspected. These changes are displayed as the differences A, B, C and D on the display 11 of the OTDR device 1. By observing the fluctuation of the differences A, B, C and D, the position of the changes in temperature, distortion or the like of the object S to be inspected can be recognized certainly in the waveform.

The sensor element 3 shown in FIG. 5 causes almost all of the light transmitted along the main line element 2 to leak out at the interfaces, consequently extremely increasing the change in intensity of the Rayleigh scattered light due to the temperature, distortion or the like of the light transmission line formed by the main line elements 2. Thus, for all that the detection sensitivity of detecting the information is further increased, the light transmission loss in the sensor element 3 is increased. Accordingly, it is effective to use one sensor element 3 per main line element 2.

Figure 6:
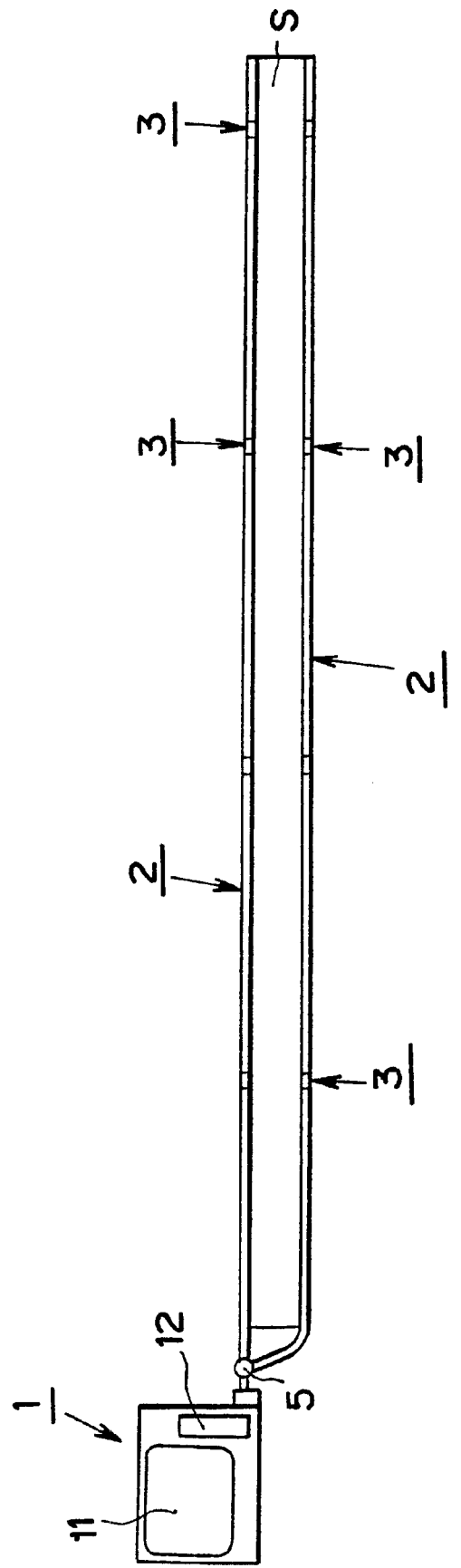
FIG. 6 shows a state in which the sensing optical fiber of FIG. 1 is used in a different manner.

FIG. 6 illustrates another embodiment in which two lines, formed of the main line elements 2 and sensor elements 3, are arranged along an object S to be inspected. The two lines are diverged by a connector 5 such as a splitter.

The embodiment shown in FIG. 6. makes it possible to versatilely detect the changes of the temperature, distortion or the like of the object S to be inspected. In this embodiment, the two lines may be operated individually or concurrently by use of a comparator or other operating means to display the detected information data comprehensively.

Figure 7:
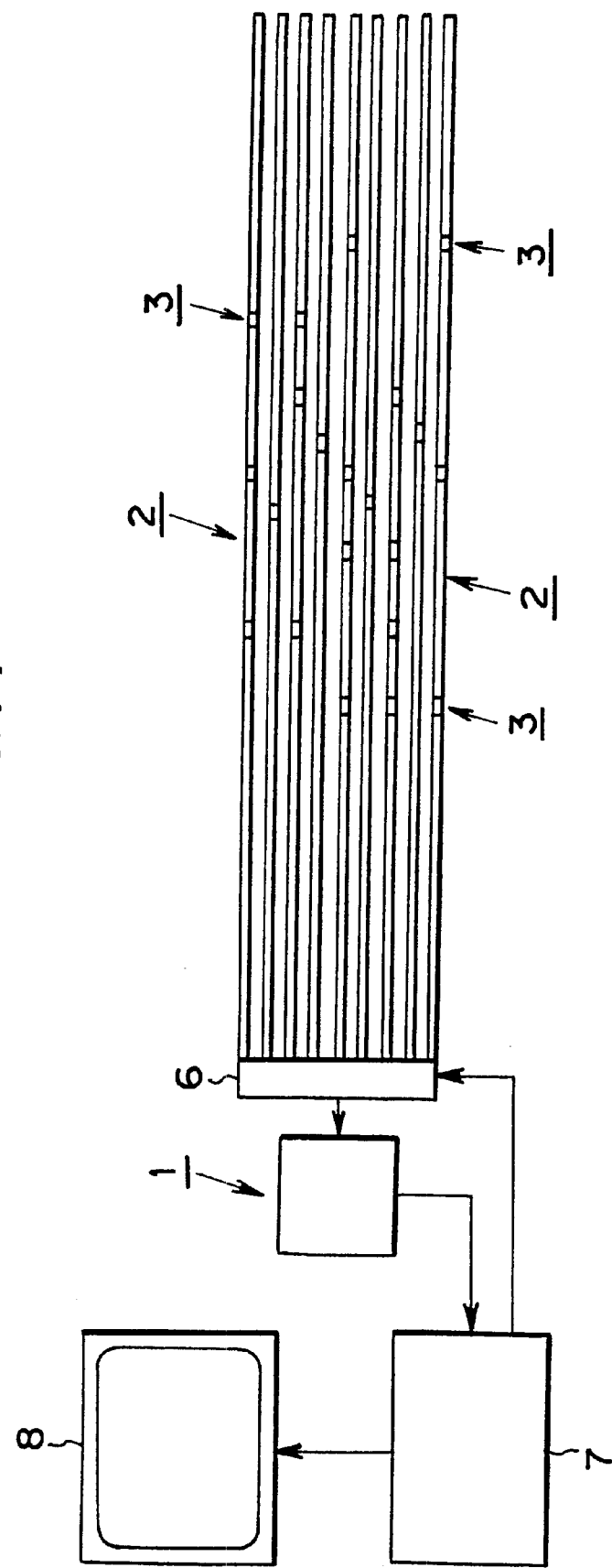
FIG. 7 is a block diagram showing the sensor system according to the present invention.

FIG. 7 illustrates the sensor system according to this invention.

The illustrated embodiment of the sensor system is formed of a plurality of sensing optical fibers having sensor elements 3 that are different in number, spacing interval and core diameter (b) so as to simultaneously transmit different sorts of information. By operating the optical switch 6 to which all the optical fibers are connected, the information detected from the specific sensing optical fiber is selected to be delivered to the OTDR device 1 serving as a measuring instrument. The optical switch 6 is controlled to execute switching actions by a controller 7. The controller 7 incorporates an arithmetic processing device so as to synthesize and analyze the detected information fed from the OTDR device 1 and then display the analyzed information on a monitor 8.

According to this embodiment, since the different sorts of information transmitted concurrently through the sensing optical fibers are selectively fed through the optical switch 6 and measured by the OTDR device 1, many sorts of information can be simultaneously dealt with, and the sensitivity of detecting the information can be increased. Furthermore, the detected information can be displayed on the monitor 8 in an advanced form (graphic, moving diagram, etc.) which is more understandable than a waveform. The various sorts of information may be concurrently analyzed by use of the controller.

The present invention can be applied for following purposes.

(1) Detection of distortion, fatigue, rupture or the like in structures such as general buildings, high-rise buildings, speedways, elevated bridges, tunnels, dams, flying fields, harbor facilities, and industrial facilities.

(2) Detection of distortion, fatigue, rupture or the like in moving structures such as frames of airplanes, ship hulls, frames of motorcars, frames of railroad vehicles, and spacecraft bodies.

(3) Detection of distortion, fatigue, rupture or the like in general building materials such as steel frames, wallplates, flooring, ceiling panels, and connecting fittings.

(4) Detection of distortion, fatigue, rupture or the like in life-lines such as oil pipelines, oil storage tanks, gas pipelines, gas tanks, water pipelines, electric cables, and (maritime or underseas) communication cables.

(5) Supervision for guarding against intruders into or protecting the environment of buildings, parks, and outside facilities.

(6) Supervision of diastrophism and ground subsidence (for earthquake prediction).

(7) Supervision or observation of living bodies.

(8) Detection of liquid adhesion.

What is claimed is:

1. A sensing optical fiber comprising:
   a main line element of optical fiber arranged as a light transmission line, said main line element having a core, and
   a plurality of sensor elements of optical fiber, each of said sensor elements being interposed between and fused to portions of said main line element, wherein each of said sensor elements has a core that is different in diameter relative to said core of said main line element, and is shorter in length relative to adjoining portions of said main line element.

2. A sensing optical fiber as claimed in claim 1, wherein said sensor elements are connected to said main line element at regular intervals.

3. A sensing optical fiber as claimed in claim 1, wherein said sensor elements are connected to said main line element at irregular intervals.

4. A sensing optical fiber as claimed in claim 1, wherein said optical fiber of said main line element is different in light transmission mode from said optical fiber of said sensor element.

5. A sensing optical fiber as claimed in claim 2, wherein said optical fiber of said main line element is different in light transmission mode from said optical fiber of said sensor element.

6. A sensing optical fiber as claimed in claim 3, wherein said optical fiber of said main line element is different in light transmission mode from said optical fiber of said sensor element.

7. A sensing optical fiber as claimed in claim 4, wherein said sensor element is inserted in an intermediate portion of said main line element.

8. A sensing optical fiber as claimed in claim 1, wherein said sensor elements are fused to said main line element at coaxial interfaces.

9. A sensing optical fiber as claimed in claim 1, wherein said main line optical fiber has an outer diameter, and
wherein each of said sensor elements has an outer diameter that is equal to the outer diameter of said main line optical fiber.

10. A sensing optical fiber comprising:
a main line element of optical fiber having a core and being arranged as an optical transmission line; and
at least one sensor element coaxially connected by fusing to portions of said main line element, wherein said sensor element is formed of material that is capable of passing light therethrough, and said sensor element is different in refractive index relative to said core of said main line element.

11. A sensing optical fiber as claimed in claim 10, wherein said at least one sensor element comprises a plurality of sensor elements fused to portions of said main line element at regular intervals.

12. A sensing optical fiber as claimed in claim 10, wherein said at least one sensor element comprises a plurality of sensor elements fused to portions of said main line element at irregular intervals.

13. A sensor system comprising:
a light transmission line having a plurality of sensing optical fibers; and
a measuring instrument for detecting information around said light transmission line by using back-scattered light of said sensing optical fibers,
each of said sensing optical fibers being formed of a main line element of optical fiber arranged as a light transmission line, and sensor elements inserted between portions of said main line element, and each of said sensor elements having a core that is different in diameter relative to a core of said main line element,
wherein each of said sensing optical fibers is different relative to the other sensing optical fibers with respect to the number, spacing interval and core diameter of said respective sensor elements; and
an optical switch located between said sensing optical fibers and said measuring instrument to selectively operate said sensing optical fibers.

14. A sensor system comprising:
a light transmission line incorporating a plurality of sensing optical fibers; and
a measuring instrument for detecting information around said light transmission line by using back-scattered light of said sensing optical fibers,
each of said sensing optical fibers being formed of a main line element of optical fiber, and a plurality of sensor elements inserted in said main line element,
each of said sensors being formed of material capable of passing light therethrough, said sensor elements each having a core that is different in refractive index from a core of said corresponding main line element,
said sensor elements in each of said main line elements being different in number, spacing interval and core diameter relative to said sensor elements in the other of said main line elements; and
an optical switch, disposed between said sensing optical fibers and said measuring instrument, for selectively operating said sensing optical fibers.

* * * * *